United States Patent

[11] 3,549,887

[72] Inventor Carl W. Hansen
      Chagrin Falls, Ohio
[21] Appl. No. 516,593
[22] Filed Dec. 27, 1965
[45] Patented Dec. 22, 1970
[73] Assignee Picker Corporation
      White Plains, N.Y.
      a corporation of New York, by mesne assignments

[54] SCINTILLATION FOR PRODUCING BOTH BLACK AND WHITE MULTI-COLOR PHOTOGRAPHIC RECORDS
18 Claims, 4 Drawing Figs.

[52] U.S. Cl. .................................................. 250/71.5,
      250/71, 250/80, 250/227, 178/6.7, 178/786
[51] Int. Cl. ........................................................ G01j 39/18,
      G01t 1/20
[50] Field of Search............................................. 250/71,
      71.5, 80, 227; 178/6.7, 6.7A, 7.86

[56] References Cited
UNITED STATES PATENTS
2,837,639  6/1958  Gray et al. ..................... 250/71.5
2,965,757 12/1960  Martin et al. .................. 250/83.3
2,967,211  1/1961  Blackstone et al............. 178/6.7
2,968,724  1/1961  Clark.............................. 250/71.5
3,159,744 12/1964  Stickney et al. .............. 250/71.5(S)
3,235,672          Beguin .......................... 178/6.7
3,280,358 10/1966  Thomson....................... 250/80X
3,299,434  1/1967  McNaney....................... 178/6.7X
3,311,918  3/1967  Koster ........................... 178/6.7X
3,014,091 12/1961  McLean ......................... 178/7.86
3,265,892  8/1966  Sheldon.......................... 250/227X
3,303,508  2/1967  Jaffe et al. ................... 346/33

Primary Examiner—Ralph G. Nilson
Assistant Examiner—Morton J. Frome
Attorney—Watts, Hoffman, Fisher and Heinke ABSTRACT: In a scintillation scanner having a probe for detecting radioactivity from an object, light pulses are provided at various positions depending on the intensity of radiation detected. The light pulses at the various positions pass through various color filters to a color film. Thus, the color of an image at various points on the film is correlated to the intensity of the radiation detected at that point in the object.

INVENTOR.
CARL W. HANSEN
BY
Watts & Fisher, attys

3,549,887

SCINTILLATION FOR PRODUCING BOTH BLACK AND WHITE MULTI-COLOR PHOTOGRAPHIC RECORDS

This invention relates to scintillation scanning of radioactive isotope concentration and distribution and more particularly to a scintillation scanner which produces a multicolor photographic record.

In present day medical techniques, scintillation scanning is used for the diagnosis of certain types of ailments such as the location of tumors and cancer. With scintillation scanning, a quantity of radioactive isotope is administered to the patient. The administered isotope collects in certain organs such, for example, as the liver. The quantity and distribution of the radioactive energy in the organ under study is then measured and recorded.

One successful scintillation scanner is described and claimed in U.S. Pat. No. 3,070,695 issued Dec. 25, 1962, to J. B. Stickney et al. With the scanner of that patent, a scintillation probe is positioned over the patient. The area to be investigated is then determined. The probe is then caused to reciprocate back and forth over the patient along closely parallel paths until a graphic representation of the distribution of isotope in the area has been produced.

In the mechanism of the referenced patent, the probe is connected to a suitable dot recording mechanism for producing one type of graphic image. The probe is also electrically and mechanically connected to a light source, such as a cathode ray tube. The electrical connection is described and claimed in greater detail in U.S. Pat. No. 3,159,744 issued Dec. 1, 1964 under the title "Scintillation Scanner Photo-Recording Circuit." This light source produces light pulses which vary both in frequency and in intensity in accordance with the amount of radioactive energy detected. The light pulses expose a photographic film to produce a graphic display of the distribution of isotopes in the area under investigation.

In recent years, proposals have been made to produce multicolor graphic displays of the distribution of radioactive energy. One such proposal uses a plurality of different colors of ink so that the finished graphic image is produced in a series of colors. A given color of ink is used to reflect a given intensity of radioactivity so that the distribution and concentration of the radioactivity is not only reflected in the numbers of dots, but in the hue or color in which the dot is printed. The production of a photorecord on colored film has also been proposed. According to this prior proposal a servomechanism is provided. A group of color filters is coupled to the servomechanism and positioned between the light source and a colored film. The servomechanism is used to shift the filters in response to the activity detected. The present invention is directed to an improved technique for producing such a multicolor photorecording.

Multiplecolored images have a number of advantages. One is that color greatly facilitates diagnosis; not only by a radiologist or other specialist performing the study; but also by surgeons and other physcians involved with a given patient but not as skilled as the specialist in analyzing the information obtained from a detector in radiation.

Additionally, in situations where the shading in various greys in a black and white image may be quite subtle and difficult to interpret or even detect, the use of the multicolored systems provides a very graphic image which facilitates the diagnosis of the condition of the patient.

With the present invention, a light source such as a cathode ray tube is utilized. The light output of the tube is deflected according to the intensity of the activity under study. The amount of light deflection is proportional to the concentration of radioactive material detected. A series of parallel light filters are provided. The deflected beam passes through one of these filters and then through a light transmitting system to a colored film. The filtered light produces a colored image on the film correlated to the intensity of radioactivity detected. This is true because the color of the filter through which the light is passed reflects the amount of light deflection and the light deflection is correlated to the intensity.

In the preferred embodiment of the invention, the circuit described and claimed in the above-referenced U.S. Pat. No. 3,159,744 is utilized. A second cathode ray tube is provided and connected into the same photorecording circuit so that one simultaneously obtains both the conventional black-and-white photographic image of distribution and a multicolored photograph.

Accordingly, the object of this invention is to provide a novel and improved scintillation scanner equipped with an improved multicolor photorecording system.

Other objects and a fuller understanding of the invention may be had by referring to the following description taken in conjunction with the accompanying drawings in which.

Except for that aspect of the device which produces a colored picture, the circuit employed in this device is substantially identical to the circuit disclosed in U.S. Pat. No. 3,159,744 issued Dec. 1, 1964, under the title "Scintillation Scanner Photo-Circuit." Accordingly, the description of that portion of the circuit which is taught in the prior patent will be minimized here.

Figure 1:
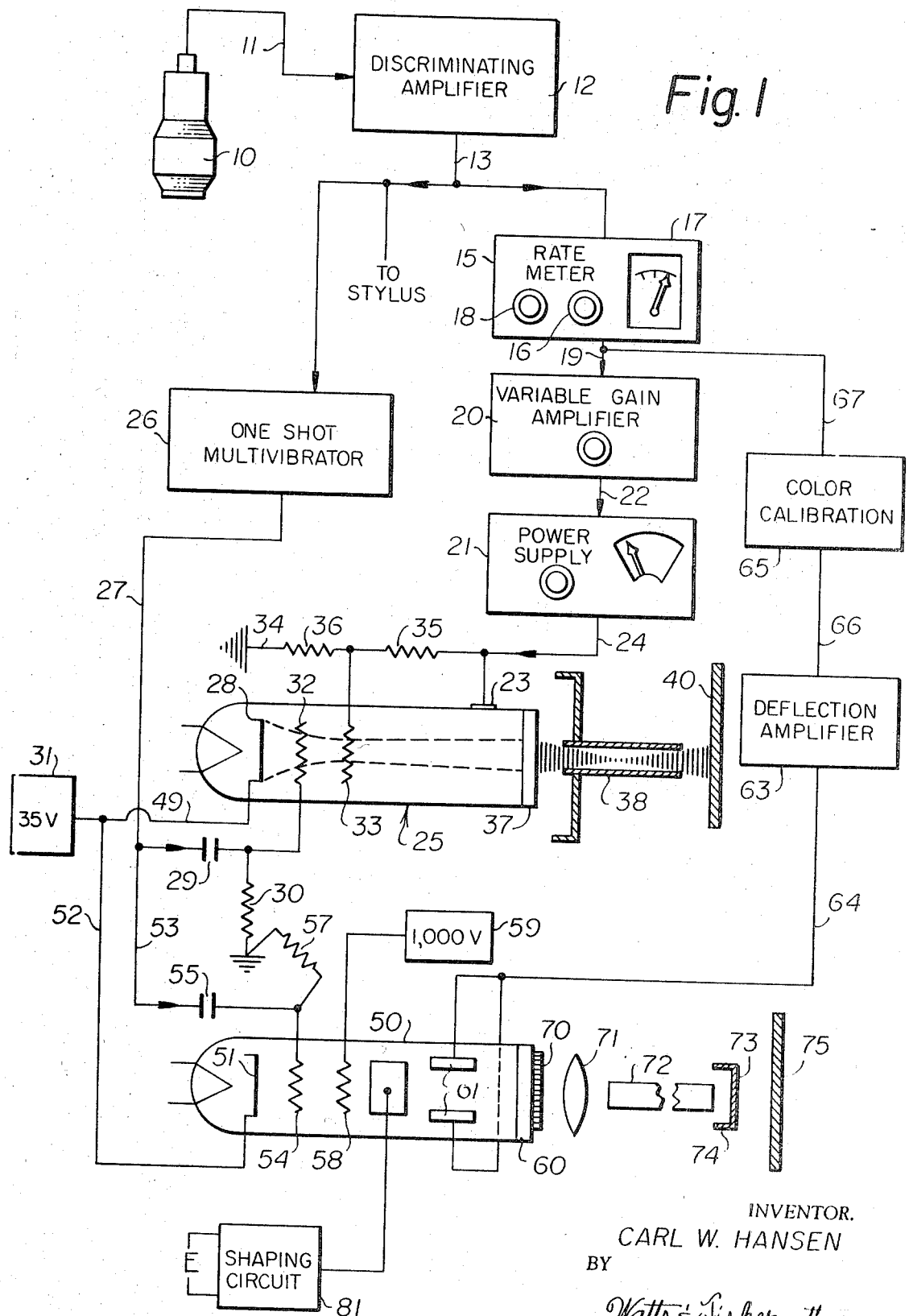
FIG. 1 is a diagrammatic wiring diagram of a circuit embodying the invention of this disclosure.

Referring to FIG. 1 of the drawing, a scintillation probe is shown generally at 10. The probe 10 may take any of the usual and well known forms. Output impulses from the probe 10 are transmitted through a conductor 11 to a suitable discriminating amplifier 12. All counts are amplified and one amplified pulse is emitted through conductor 13 for each radioactive impulse detected by the probe 10 and falling within a selected pulse height range.

A rate meter 15 is connected to the conductor 13. A range control 16 is provided for selecting an appropriate scale on meter dial 17. A time constant selector 18 is provided. The time constant is a length of time over which the count rate is measured to determine the rate.

The output of the rate meter 15 is conducted by a conductor 19 to a variable gain, direct coupled amplifier 20. A power supply 21 is provided and a conductor 22 connects the variable amplifier 20 to the power supply 21. The varying output of the variable amplifier controls the power supply and causes its output to vary proportionally with the variable amplifier output and therefore with the probe count rate. The output of the power supply 21 is connected through a conductor 24 to an accelerating electrode 23. The accelerating electrode or ring forms a part of a cathode ray tube shown generally at 25. The tube 25 is used for black and white pictures and accordingly will be referred to here as the white cathode ray tube.

A pulse height analyzer in the form of a one-shot multivibrator 26 is also connected to the conductor 13. The multivibrator is of the type which will emit one impulse of a predetermined time duration and power for each pulse transmitted to it by the conductor 13. The one shot multivibrator 26 is connected through conductor 27 to grid 32 of the white cathode ray tube 25. A coupling condenser 29 is included in the conductor 27. The grid 32 is grounded through a biasing resistor 30. In this regard the circuit is slightly different from the circuit of the referenced patent. In the circuit of the referenced patent, the grid was a ground potential and cathode 28 was connected to the multivibrator 26. With the grid 32 connected to the multivibrator, the cathode 28 is connected by conductor 49 to a 35-volt power supply 31.

The white cathode ray tube 25 includes an accelerating or focusing anode 33. The focusing or accelerating anode 33 has its voltage supplied by a voltage divider 35, 36 across the power supply 21. The resistor 36 of the voltage divider is connected to ground by conductor 34. The white cathode ray tube 25 includes the usual target 37 in the form of an output phosphor or fluorescent screen. A collimator 38 focuses the emitted light to an appropriate sized dot for impingement on a black and white photographic film 40.

As is more fully explained in the referenced patent, with the described mechanism, once the discriminated level of activity is obtained, one light impulse will be emitted by the white cathode ray tube 25 for each count detected by the probe and passed by the amplifier 12. The intensity of the emitted light pulse will vary with the count rate because the voltage on the focusing anode varies with the count rate. Thus, the intensity, or density, of an exposure on the film 40 in any given spot will reflect the count rate in a corresponding spot in the area studied. Since the probe and the cathode ray tube move together as a scan is conducted, the resultant film exposure is a graphic reproduction which outlines the distribution pattern and the concentration of radioactivity in an area under study.

A color cathode ray tube 50 is provided. The color cathode ray tube 50 has a cathode 51 which is connected by a conductor 52 to the 35-volt power supply 31. The one-shot multivibrator 26 is connected through a conductor 53 to a grid 54 of the color tube 50. A coupling condenser 55 corresponding to the condenser 29 is included in the conductor 53. Grid 54 is connected to ground through a suitable resistor 57. The connection of the color cathode ray tube 50 thus far described is identical to the connection of the corresponding components of the white cathode ray tube 25. The remainder of the tube, however, is connected differently to produce the multicolor scan.

An accelerating or focusing anode 58 of the color tube 50 is connected to a suitable power supply 59. The power supply 59 may typically be 1,000 volts. The color tube 50 has an output phosphor 60. A first pair of focusing electrodes 61 are within the envelope of the color tube 50 and near the output phosphor 60. Since this first pair of focusing electrodes 61 is used for deflecting a light beam emitted by the tube 15, these electrodes will be referred to as the deflection electrodes.

The deflection electrodes are connected to a deflection amplifier 63 by a conductor 64. A deflection amplifier amplifies a signal received from a color calibration device 65 through a conductor 66. The color callibration device 65 is connected to the rate meter 15 through a conductor 67. The color callibration device may consist simply of a potentiometer for adjusting the amount of deflection of the light beam caused by the deflection electrodes 61. The deflection amplifier is suitably any DC type amplifier used on a known cathode ray oscilloscope. Thus, this deflection amplifier deflects the cathode ray beam of the color tube 50 through a circuit which is identical to a deflection circuit in a cathode ray tube oscilloscope.

Since the deflection amplifier is connected to the rate meter through the color callibration device 65, the amount of energy transmitted to the deflection electrodes 61 will be proportional to the amount of activity detected by the probe 10. This is true because the output of the rate meter is, as described above, proportional to the activity of the detector. Thus, while in the white cathode ray tube 25 the intensity of the emitted light beam is proportional to the count rate, in the case of the color tube 50, the deflection of the light beam from the axis of its tube is proportional to the count rate.

A series of juxtaposed parallel, light filters 70 are secured to the output phosphor 60. As an examination of FIG. 2 will show, these color filters together form a rectangular pattern which is disposed symmetrically about the axis of the color tube.

The amount of deflection of the light beam of the color tube 50 will cause the light beam to pass through a selected one of the filters 70. After the light has passed through a selected one of the filters 70, it passes through a lens 71 which deflects the light beam to focus it on a light pipe 72. Ideally, the light pipe 72 consists of a series of parallel light fibers. Thus, the light pipe 72 is a so-called fiber-optic structure which will conduct the light and which may be flexible as is suggested by the somewhat schematic showing of it in FIG. 3.

The output of the light pipe 72 passes through a suitable aperture or slit 73 in a collimating device 74 and then exposes a sheet of color photographic film 75.

Figure 3:
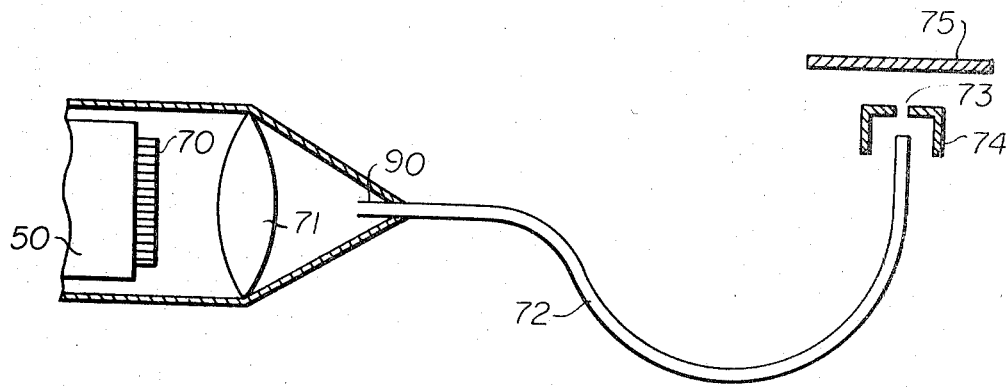
FIG. 3 is a diagrammatic drawing of the optical coupling of the output of the color cathode ray tube to color film.
Figure 4:
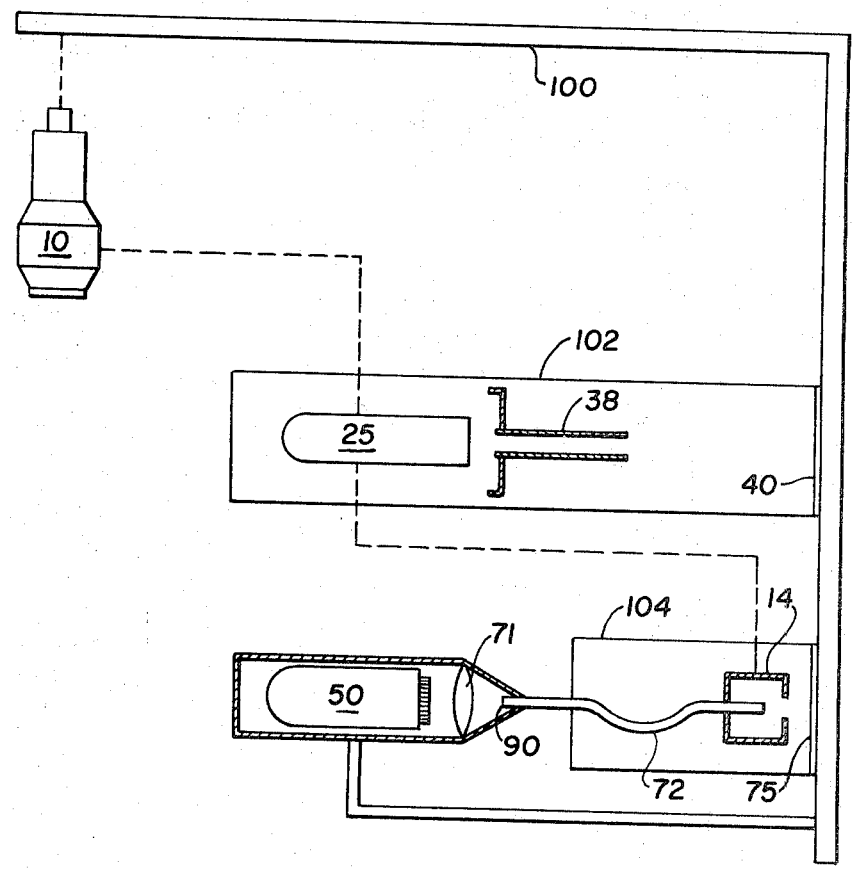
FIG. 4 is a diagrammatic drawing of a preferred mounting arrangement.

As will be apparent from an examination of either of the above-referenced patents, in order to produce a graphic reproduction of the distribution of radioactivity in the patient it is necessary to cause the color cathode ray tube 50 and/or the light pipe 72 to move relative to the film 75. Thus, the color tube 50 and the light pipe 72 may be fixed relative to the probe 10 and move with it or, conversely, this light system is held stationary while the colored film 75 moves with the probe. In the preferred arrangement, the white cathode ray tube 25, is fixed to and moves with the probe 10. The color cathode ray tube is fixed to the frame. The light pipe 72 is flexible and fixedly connected to both the probe 10 and the tube 50. This permits a considerably smaller dark box for the colored film because the tube 50 is not housed within it. FIG. 4 diagrammatically illustrates such an arrangement, in which the probe assembly including the probe 10 is movably mounted on a support assembly 100. Film support structure, such as light boxes 102, 104, is connected to the support assembly 100. In the recording structure, the output end of the light pipe 72 (at collimating device 74) is mechanically linked to the probe 10 for movement with the probe relative to the color film 75. The input end 90 of the light pipe 72 (at the lens 71) is fixed relative to the filters 70 and the color tube 50, as shown in FIG. 3.

If a positive color film is used, the filter through which the light is passed will be of the color the produced dot should have. Thus, if one wishes to produce a blue dot on positive film with a given amount of light beam deflection, a blue filter will be employed. If the color film is negative, it is then of course necessary to use a filter of the complementary color. Thus, as an example, to produce a blue dot with a negative film it is necessary to use a yellow filter so that when a positive is printed from a colored negative blue will appear.

The device as thus far described is operative but has one small problem attendant to it. With the device thus far described, the deflection of the light beam will be in a single plane which includes the axis of the color tube 50. In time, this will damage the output phosphor 60. Accordingly, it is desirable to sweep the deflected light beam back and forth along the filters. For example, if the light beam is deflected to filter 80 it is desirable that the light beam sweep from left to right and return as viewed in FIG. 2, while constantly passing through the filter 80. This sweeping is accomplished by a pair of focusing sweep electrodes 81 which are respectively in planes normal to the planes of the deflection electrodes 61 and normal to a plane paralleling any one of the filters 70. The sweep electrodes 81 are energized by a suitable shaping circuit 82. One suitable shaping circuit is shown schematically in FIG. 2.

Figure 2:
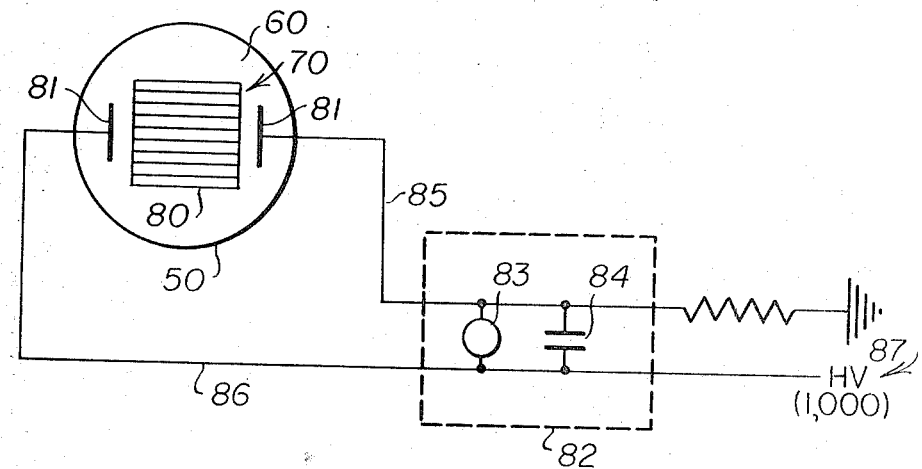
FIG. 2 is a diagrammatic drawing of a deflection amplifier used to scan the light output of the color cathode ray tube back and forth across any given filter.

Any sweep generator of the type used in an oscilloscope will serve the purpose. The shaping circuit 82 of FIG. 2 is comprised of a neon light 83 and a capacitor 84 connected across conductors 85, 86. The conductors 85, 86 are conducted to a suitable high-voltage source 87, of, for example, 1,000 volts. With this circuit, the capacitor 84 charges until it reaches a level at which the neon light 83 flashes. When the light 83 flashes, the capacitor 84 is partially discharged. Accordingly, the output of the shaping circuit is a sawtooth-like wave which causes the light beam of the colored tube 50 to scan relatively slowly from one side of the filter to the other and then, when the light 83 flashes, to index quickly back to the starting point for another slow sweep.

While the action of the focusing electrodes 61, 81 is to move the light beam to any position within the rectangle defined by the filter 70, the output from the light pipe 72 is nonetheless always focused on the aperture 73. This is accomplished by positioning input end 90 of the light pipe 72 at the focal point of the lens 71. Thus, any light passing through the lens 71 is focused on the input end 90 and then transmitted by the light pipe 72 to the slit 73 and the film 75.

Although the invention has been described in its preferred form with a certain degree of particularity it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In a scintillation recording device, the improvement comprising:
   a. scintillation responsive means;
   b. light means for emitting light pulses;
   c. circuitry connecting said scintillation responsive means to said light means for causing light pulses to be emitted by said light means in response to activity detected by said scintillation responsive means;
   d. a plurality of color filters of differing light filtering characteristics mounted in fixed spatial relationship to said light means;
   e. color control means controlling said light means for causing said light pulses to be emitted at different positions relative to said filters in response to different levels of activity detected to direct said pulses through a selected filter; and,
   f. recording means optically coupled to said filters for recording pulses of different colored light from said different fixed positions.

2. The device of claim 1 wherein said recording means includes a light pipe and a sheet of colored photographic film.

3. The device of claim 2 wherein a lens focuses the output from said filters on the light pipe.

4. The device of claim 1 wherein the light means is a cathode ray tube and the filters are near the output end of the tube.

5. The device of claim 4 wherein the color control means comprises;
   a. a deflection electrode forming a part of the said cathode ray tube; and,
   b. circuitry connecting said electrode to said scintillation means to energize said control means proportionally to the activity detected.

6. The device of claim 5 wherein a means to sweep the light pulses is provided.

7. The device of claim 6 wherein the sweep means comprises a sweep electrode forming a part of said cathode ray tube and a shaping circuit connected to the sweep electrode.

8. The device of claim 1 wherein a means to sweep the light pulses is provided.

9. The device of claim 8 wherein the sweep means comprises a sweep electrode forming a part of said cathode ray tube and a shaping circuit connected to the sweep electrode.

10. The device of claim 1 wherein:
    a. the scintillation responsive means comprises a probe;
    b. the light means comprises a cathode ray tube;
    c. the circuitry connecting the responsive means to the light means includes a discriminating amplifier and a pulse analyzer; and
    d. the color control means comprises an electrode forming a part of said cathode ray tube and a circuit including a rate meter and a deflection amplifier connecting said discriminating amplifier to said electrode.

11. The device of claim 10 wherein said recording means includes a light pipe and a sheet of colored photographic film.

12. The device of claim 11 wherein a lens focuses the output from said filters on the light pipe.

13. The device of claim 12 wherein a means to sweep the light beam is provided.

14. The device of claim 13 wherein the means to sweep the light beam comprises a sweep electrode forming a part of said cathode ray tube and a shaping circuit connected to the sweep electrode.

15. In a scintillation recording device, the improvement comprising:
    a. scintillation responsive means for providing electrical signal pulses in response to radiation detected;
    b. detection means connected to receive said signal pulses for providing an output signal whose amplitude varies with quanta of radiation detected by said scintillation responsive means;
    c. a first source of light for exposing a black and white sensitive film;
    d. first energizing means connected to receive said output signal and energize said first source of light to provide light whose intensity varies in accordance with the amplitude of said output signal;
    e. a plurality second of sources of different colored light located at different fixed positions;
    f. energizing means connected to receive said output signal and selectively control energization of said plurality second of sources of colored light at said different positions in response to different amplitudes of said output signal; and
    g. optical means for focusing all of said second sources of different colored light at substantially a single spot.

16. The device of claim 15, wherein said first source of light is a cathode ray tube.

17. The device of claim 15, wherein said plurality of second sources of different colored light includes a cathode ray tube and a plurality of color filters.

18. The device of claim 15, wherein said first source of light is a first cathode ray tube, and said plurality of second sources of different colored light includes a second cathode ray tube and a plurality of color filters.

UNITED STATES PATENT OFFICE
CERTIFICATE OF CORRECTION

Patent No. 3,549,887  Dated December 22, 1970

Inventor(s) Carl W. Hansen

It is certified that error appears in the above-identified patent and that said Letters Patent are hereby corrected as shown below:

In the Title:

"Scintillation for Producing Both Black and White Multi-Color Photographic Records" should be changed to:

---Scintillation Scanning for Producing Both Black and White Multi-Color Photographic Records---

SIGNED AND
SEALED
16 1971

(SEAL)
Attest:

Edward M. Fletcher, Jr.
Attesting Officer

WILLIAM E. SCHUYLER, JR.
Commissioner of Patents